United States Patent
Lin

(10) Patent No.: US 11,039,463 B2
(45) Date of Patent: Jun. 15, 2021

(54) METHOD FOR UPLINK CONTROL INFORMATION TRANSMISSION, TERMINAL DEVICE AND ACCESS NETWORK DEVICE

(71) Applicant: GUANGDONG OPPO MOBILE TELECOMMUNICATIONS CORP., LTD., Guangdong (CN)

(72) Inventor: Yanan Lin, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/684,465

(22) Filed: Nov. 14, 2019

(65) Prior Publication Data
US 2020/0092902 A1    Mar. 19, 2020

Related U.S. Application Data

(63) Continuation of application No. PCT/CN2017/085029, filed on May 19, 2017.

(51) Int. Cl.
*H04W 72/12* (2009.01)

(52) U.S. Cl.
CPC ... *H04W 72/1268* (2013.01); *H04W 72/1284* (2013.01)

(58) Field of Classification Search
CPC .............. H04W 72/1268; H04W 72/1284
See application file for complete search history.

(56) References Cited

U.S. PATENT DOCUMENTS

| 6,975,610 B1 | 12/2005 | Van Der Tuijn |
| 2004/0196872 A1 | 10/2004 | Nakamura |
| 2013/0021921 A1 | 1/2013 | He |
| 2015/0181576 A1 | 6/2015 | Papasakellariou et al. |

(Continued)

FOREIGN PATENT DOCUMENTS

| CN | 102215084 A | 10/2011 |
| CN | 102685895 A | 9/2012 |

(Continued)

OTHER PUBLICATIONS

Babaei et al., U.S. Appl. No. 62/501,556, Data Scheduling in a Wireless Network, dated May 4, 2017 (Year: 2017).*

(Continued)

*Primary Examiner* — Justin T Van Roie
(74) *Attorney, Agent, or Firm* — Ladas & Parry, LLP

(57) ABSTRACT

Provided are an uplink control information transmission method, device, and system. The method includes: when a first scheduling request and uplink information need to be sent in a target time unit, a terminal device simultaneously sends the uplink information and a second SR to an access network device on a physical resource in the target time unit. The terminal device uses multiple uplink logical channels for data transmission, the first SR is used for indicating at least one uplink logical channel containing available data in the multiple uplink logical channels, the second SR is used for indicating whether there is available uplink data on the multiple uplink logical channels, and parameters of at least two of the multiple uplink logical channels are different.

15 Claims, 5 Drawing Sheets

(56) References Cited

U.S. PATENT DOCUMENTS

| | | | | |
|---|---|---|---|---|
| 2018/0324635 | A1* | 11/2018 | Babaei | H04W 74/0891 |
| 2019/0059096 | A1* | 2/2019 | Wang | H04W 72/0413 |

FOREIGN PATENT DOCUMENTS

| | | | | |
|---|---|---|---|---|
| CN | 105850058 A | | 8/2016 | |
| EP | 2675081 A1 | | 12/2013 | |
| RU | 2515605 C2 | | 5/2014 | |
| WO | 2017053637 A1 | | 3/2017 | |
| WO | WO-2018202087 A1 | * | 11/2018 | H04W 72/04 |

OTHER PUBLICATIONS

International Search Report in the international application No. PCT/CN2017/085029, dated Feb. 24, 2018.

English Translation of the Written Opinion of the International Search Authority in the international application No. PCT/CN2017/085029, dated Feb. 24, 2018.

Ericsson: "SR and BSR signalling content in NR", 3GPP Draft; R2-1702745—SR and BSR Signalling Content in NR, 3rd Generation Partnership Project (3GPP), Mobile Competence Centre; 650, Route Des Lucioles ; F-06921 Sophia-Antipolis Cedex ; France, vol. RAN WG2, No. Spokane, USA; Apr. 3, 2017-Apr 7, 2017 Apr. 3, 2017 (Apr. 3, 2017), XP051244733, Retrieved from the Internet: URL:http://www.3gpp.org/ftp/Meetings_3GPP_SYNC/RAN2/Docs/ [retrieved on Apr. 3, 2017].

"3rd Generation Partnership Project; Technical Specification Group Radio Access Network; Study on New Radio Access Technology Physical Layer Aspects (Release 14)", 3GPP Standard ; Technical Report ; 3GPP TR 38.802, 3rd Generation Partnership Project (3GPP), Mobile Competence Centre ; 650, Route Des Lucioles ; F-06921 Sophia-Antipolis Cedex; France, vol. RAN WG1, No. V14.0.0, Mar. 25, 2017 (Mar. 25, 2017), pp. 1-143, XP051297632, [retrieved on Mar. 25, 2017].

Ericsson: "Scheduling Request Enhancements", 3GPP Draft; R1-1709097, 3rd Generation Partnership Project (3GPP), Mobile Competence Centre ; 650, Route Des Lucioles ; F-06921 Sophia-Antipolis Cedex ; France, vol. RAN WG1, No. Hangzhou, China; May 15, 2017-May 19, 2017 May 14, 2017 (May 14, 2017), XP051274255, Retrieved from the Internet: URL:http://www.3gpp.org/ftp/Meetings_3GPP_SYNC/RAN1/Docs/ [retrieved on May 14, 2017].

Qualcomm Incorporated: "Simultaneous UL SR channel", 3GPP Draft; R1-1708626 Simultaneous SR and Data for URLLC UL, 3rd Generation Partnership Project (3GPP), Mobile Competence Centre; 650, Route Des Lucioles ; F-06921 Sophia-Antipolis Cedex; France, vol. RAN WG1, No. Hangzhou; May 15, 2017-May 19, 2017 May 14, 2017 (May 14, 2017), XP051273814, Retrieved from the Internet: URL:http://www.3gpp.org/ftp/Meetings_3GPP_SYNC/RAN1/Docs/ [retrieved on May 14, 2017].

Huawei et al: "SR enhancements with multiple numerologies", 3GPP Draft; R2-1705625 SR Enhsncements With Multiple Numerologies, 3rd Generation Partnership Project (3GPP), Mobile Competence Centre ; 650, Route Des Lucioles ; F-06921 Sophia-Antipolis Cedex ; Fran, vol. RAN WG2, No. Hangzhou, China; May 15, 2017-May 19, 2017 May 14, 2017 (May 14, 2017), XP051275948, Retrieved from the Internet: URL:http://www.3gpp.org/ftp/Meetings_3GPP_SYNC/RAN2/Docs/ [retrieved on May 14, 2017].

Supplementary European Search Report in the European application No. 17909868.6, dated Mar. 19, 2020.

Nokia, Alcatel-Lucent Shanghai Bell; "Multiplexing between SR and other UCI on short PUCCH", 3GPP TSG RAN WG1#89, R1-1708511 Hangzhou, P.R. China, May 15-19, 2017, section 2.

Huawei, HiSilicon; "PUCCH resource allocation for HARQ-ACK and SR", 3GPP TSG RAN WG1 Meeting #89, R1-1706960 Hangzhou, China, May 15-19, 2017, section 22.

Samsung; "Resource allocation for PUCCH with SR", 3GPP TSG RAN WG1 Meeting #89, R1-1708011 Hangzhou, China, May 15-19, 2017, "Options for SR enhancements".

First Office Action of the Russian application No. 2019139994, dated Sep. 24, 2020.

First Office Action of the Chinese application No. 201911319662.4, dated Nov. 3, 2020.

First Office Action of the Chilean application No. 201903305, dated Dec. 17, 2020.

Second Office Action of the Chinese application No. 201911319662A, dated Feb. 10, 2021.

3GPP TS 36.213 V14.2.0 (Mar. 2017), Physical uplink control channel procedures, Release 14, pp. 303-384.

3GPP TS 36.321 V14.2.1 (Mar. 2017), 3rd Generation Partnership Project; Technical Specification Group Radio Access Network; Evolved Universal Terrestrial Radio Access (E-UTRA); Medium Access Control (MAC) protocol specification (Release 14).

* cited by examiner

METHOD FOR UPLINK CONTROL INFORMATION TRANSMISSION, TERMINAL DEVICE AND ACCESS NETWORK DEVICE

CROSS-REFERENCE TO RELATED APPLICATIONS

This is a continuation application of International Application No. PCT/CN2017/085029 filed on May 19, 2017, the disclosure of which is hereby incorporated by reference in its entirety.

TECHNICAL FIELD

The disclosure relates to the field of communication, and more particularly to a method, device and system for uplink control information transmission.

BACKGROUND

A Scheduling Request (SR) is configured to notify a base station to allocate corresponding uplink transmission resources for uplink data in a terminal device.

In a Long Term Evolution (LTE) system, if User Equipment (UE) needs to send uplink data to an Evolved Node B (eNB), the UE sends an SR to the eNB at first by use of physical resources of a pre-configured Physical Uplink Control Channel (PUCCH). The eNB configures an uplink transmission resource for the UE according to the SR, to enable the UE to send the uplink data to the eNB according to the uplink transmission resource configured by the eNB.

In the abovementioned method, the eNB pre-configures a dedicated physical resource for each UE to transmit an SR.

BRIEF DESCRIPTION OF DRAWINGS

In order to describe the technical solutions of the embodiments of the disclosure more clearly, the drawings required to be used in descriptions about the embodiments will be simply introduced below. It is apparent that the drawings described below are only some embodiments of the disclosure. Other drawings may further be obtained by those of ordinary skill in the art according to these drawings without creative work.

DETAILED DESCRIPTION

Figure 1:
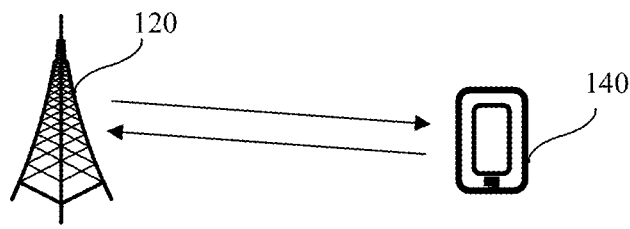
FIG. 1 is a structure diagram of a mobile communication system according to an exemplary embodiment of the disclosure.

In order to make the purpose, technical solutions and advantages of the disclosure clearer, the implementation of the disclosure will further be described below in combination with the drawings in detail.

"First", "second" and similar words in the disclosure do not represent any sequence, number or significance but are only adopted to distinguish different components. Similarly, "a/an", "one" or similar words also do not represent number limits but represent existence of at least one. "Connect", "mutually connected" or similar words are not limited to physical or mechanical connection but may include electrical connection, either direct or indirect.

"Module" in the disclosure usually indicates a process or instruction stored in a memory and capable of realizing some functions. "Unit" in the disclosure usually indicates a functional structure which is logically divided. A "unit" may be implemented completely by hardware or implemented by a combination of software and the hardware.

"Multiple" in the disclosure indicates two or more than two. "And/or" describes an association relationship between associated objects and represents that three relationships may exist. For example, A and/or B may represent three conditions: i.e., independent existence of A, existence of both A and B and independent existence of B. Character "/" usually represents that previous and next associated objects form an "or" relationship.

In the related art, a terminal device uses multiple uplink logical channels for data transmission. A logical channel is a channel through which a Medium Access Control (MAC) layer provides service for a Radio Link Control (RLC) layer. When there is an uplink logical channel containing available uplink data (i.e., uplink data to be sent) in the terminal device, the terminal device is required to send an SR to a base station. The SR is used for indicating the base station one or more uplink logical channels containing the available uplink data in the terminal device, or, the SR is used for indicating the specific uplink logical channels containing the available uplink data to the base station. Therefore, the base station sends configuration information in advance to the terminal device, and the configuration information is used for configuring a physical resource for transmission of the SR for the terminal device. The physical resource is a 2 bit physical resource, and the SR is 2 bit information. Correspondingly, the terminal device transmits the SR using the 2 bit physical resource. There is a correspondence between a value of the SR and the uplink logical channel.

In at least one embodiment, the value of the SR has a one-to-one correspondence with the uplink logical channel. Schematically, assume that there are 4 uplink logical channels, the correspondence is illustrated in Table 1. The SR has 4 values: "00", "01", "10" and "11". When the value of the SR is "00", it is indicated that the available uplink data is in the uplink logical channel 1 for the terminal device. When the value of the SR is "01", it is indicated that the available uplink data is in the uplink logical channel 2 for the terminal device. When the value of the SR is "10", it is indicated that the available uplink data is in the uplink logical channel 3 for the terminal device. When the value of the SRS is "11", it is indicated that the uplink data to be sent is in the uplink logical channel 4 for the terminal device.

TABLE 1

| SR | Uplink logical channel |
|---|---|
| 00 | Uplink logical channel 1 |
| 01 | Uplink logical channel 2 |
| 10 | Uplink logical channel 3 |
| 11 | Uplink logical channel 4 |

In the abovementioned method, the base station preconfigures a dedicated physical resource for the terminal device to perform transmission of the SR, and the physical resource may be a PUCCH resource. A utilization rate of the dedicated physical resource in a present LTE system is low. Based on such a technical problem, the disclosure provides a method, device and system for uplink control information (UCI) transmission. References will be made below to the method embodiments provided in FIG. 1 to FIG. 5.

According to a first aspect of the embodiments of the disclosure, a method for UCI transmission is provided, which may include the following operations.

In condition that a first SR and uplink information need to be sent in a target time unit, a terminal device simultaneously sends the uplink information and a second SR to an access network device on a physical resource in the target time unit.

The terminal device may use multiple logical channels for data transmission, the first SR may be used for indicating at least one uplink logical channel containing available uplink data in the multiple uplink logical channels, the second SR may be used for indicating whether there is available uplink data on the multiple uplink logical channels, and parameters of at least two of the multiple uplink logical channels may be different.

In at least one implementation mode, the parameter of the uplink logical channel may include at least one of a transmission time interval (TTI), a subcarrier spacing, a delay or reliability.

In at least one implementation mode, the uplink information may include at least one of feedback response information Acknowledgement (ACK)/Non-Acknowledgement (NACK), channel state information (CSI) or uplink service data.

In at least one implementation mode, the operation that the terminal device simultaneously sends the uplink information and the second SR to the access network device on the physical resource in the target time unit may include the following action.

The terminal device sends the uplink information to the access network device using a first type of physical resources in the target time unit.

The first type of physical resources may be physical resources for transmission of the first SR.

In at least one implementation mode, the first type of physical resources may include multiple first physical resources, and the multiple first physical resources may have a correspondence with the multiple uplink logical channels.

The operation that the terminal device sends the uplink information to the access network device using the first type of physical resources in the target time unit may include the following action.

The terminal device sends the uplink information to the access network device using at least one first physical resource in the target time unit.

In at least one implementation mode, the at least one first physical resource may include a physical resource corresponding to a first logical channel, and the first logical channel may be an uplink logical channel determined by the terminal device according to a priority of the parameter corresponding to the uplink logical channel containing the available data.

In at least one implementation mode, the priority of the parameter corresponding to the uplink logical channel may be predetermined in a protocol.

In at least one implementation mode, before the operation that the terminal device sends the uplink information to the access network device using the first type of physical resources in the target time unit, the method may further include the following operation.

The terminal device receives first configuration information sent by the access network device. The first configuration information is used for configuring the first type of physical resources for the terminal device.

In at least one implementation mode, the operation that the terminal device simultaneously sends the uplink information and the second SR to the access network device on the physical resource in the target time unit may include the following action.

The terminal device sends the uplink information and the second SR to the access network device using a second type of physical resources in the target time unit.

The second type of physical resources may be physical resources for transmission of the uplink information.

In at least one implementation mode, the second SR may be 1 bit information. In condition that a value of the 1 bit information is a first preset value, it is indicated that there is available uplink data on the multiple uplink logical channels, and in condition that the value of the 1 bit information is a second preset value, it is indicated that there is no available uplink data on the multiple uplink logical channels.

In at least one implementation mode, before the operation that the terminal device sends the uplink information and the second SR to the access network device using the second type of physical resources in the target time unit, the method may further include the following operation.

The terminal device receives second configuration information sent by the access network device. The second configuration information is used for configuring the second type of physical resources for the terminal device.

According to a second aspect of the embodiments of the disclosure, a method for UCI transmission is provided, which may include the following operations.

In condition that a first SR and uplink information need to be received in a target time unit, an access network device receives the uplink information and a second SR simultaneously sent by a terminal device on a physical resource in the target time unit.

Multiple uplink logical channels may be used by the terminal device for data transmission, the first SR may be used for indicating at least one logical channel containing available uplink data in the multiple uplink logical channels, the second SR may be used for indicating whether there is available uplink data on the multiple uplink logical channels, and parameters of at least two of the multiple uplink logical channels may be different.

In at least one implementation mode, the parameter of the uplink logical channel may include at least one of a TTI, a subcarrier spacing, a delay or reliability.

In at least one implementation mode, the uplink information may include at least one of feedback response information ACK/NACK, CSI or uplink service data.

In at least one implementation mode, the operation that the access network device receives the uplink information and the second SR simultaneously sent by the terminal device on the physical resource in the target time unit may include the following action.

The access network device receives the uplink information sent by the terminal device using a first type of physical resources in the target time unit.

The first type of physical resources may be physical resources for transmission of the first SR.

In at least one implementation mode, the access network device may send first configuration information to the terminal device. The first configuration information is used for configuring the first type of physical resources for the terminal device.

In at least one implementation mode, the first type of physical resources may include multiple first physical resources, and the multiple first physical resources may have a correspondence with the multiple uplink logical channels.

The operation that the access network device receives the uplink information and the second SR simultaneously sent by the terminal device on the physical resource in the target time unit may include the following action.

The access network device receives the uplink information sent by the terminal device using at least one first physical resource in the target time unit.

In at least one implementation mode, the at least one first physical resource may include a physical resource corresponding to a first logical channel, and the first logical channel may be an uplink logical channel determined by the terminal device according to a priority of the parameter corresponding to the uplink logical channel containing the available data.

In at least one implementation mode, the priority of the parameter corresponding to the uplink logical channel may be predetermined in a protocol.

In at least one implementation mode, the operation that the access network device receives the uplink information and the second SR simultaneously sent by the terminal device on the physical resource in the target time unit may include the following action.

The access network device receives the uplink information and the second SR sent by the terminal device using a second type of physical resources in the target time unit.

The second type of physical resources may be physical resources for transmission of the uplink information.

In at least one implementation mode, the access network device may send second configuration information to the terminal device. The second configuration information is used for configuring the second type of physical resources for the terminal device.

In at least one implementation mode, the second SR may be 1 bit information. In condition that a value of the 1 bit information is a first preset value, it is indicated that there is available uplink data on the multiple uplink logical channels, and in condition that the value of the 1 bit information is a second preset value, it is indicated that there is no available uplink data on the multiple uplink logical channels.

According to a third aspect of the embodiments of the disclosure, a device for UCI transmission is provided, which includes at least one unit. The at least one unit is configured to implement the method for UCI transmission provided in the first aspect or any implementation mode in the first aspect.

According to a fourth aspect of the embodiments of the disclosure, a device for UCI transmission is provided, which includes at least one unit. The at least one unit is configured to implement the method for UCI transmission provided in the second aspect or any implementation mode in the second aspect.

According to a fifth aspect of the embodiments of the disclosure, a terminal device is provided. The terminal device includes a processor, a memory, a sender and a receiver.

The memory is configured to store one or more than one instruction. The instruction is instructed to be executed by the processor.

The processor is configured to, in condition that a first SR and uplink information need to be sent in a target time unit, simultaneously send the uplink information and a second SR to an access network device on a physical resource in the target time unit.

The terminal device uses multiple uplink logical channels for data transmission, the first SR is used for indicating at least one uplink logical channel containing available uplink data in the multiple uplink logical channels, the second SR is used for indicating whether there is available uplink data on the multiple uplink logical channels, and parameters of at least two of the multiple uplink logical channels are different.

According to a sixth aspect of the embodiments of the disclosure, an access network device is provided. The access network device includes a processor, a memory, a sender and a receiver.

The memory is configured to store one or more than one instruction. The instruction is instructed to be executed by the processor.

The processor is configured to, in condition that a first SR and uplink information need to be received in a target time unit, receive the uplink information and a second SR simultaneously sent by a terminal device on a physical resource in the target time unit.

Multiple uplink logical channels are used by the terminal device for data transmission, the first SR is used for indicating at least one uplink logical channel containing available uplink data in the multiple uplink logical channels, the second SR is used for indicating whether there is available uplink data on the multiple uplink logical channels, and parameters of at least two of the multiple uplink logical channels are different.

According to a seventh aspect of the embodiments of the disclosure, a computer-readable medium is provided, which stores one or more than one instruction. The instruction is loaded and executed by a processor to implement the method for UCI transmission provided in the first aspect or any implementation mode in the first aspect.

According to an eighth aspect of the embodiments of the disclosure, a computer-readable medium is provided, which stores one or more than one instruction. The instruction is loaded and executed by a processor to implement the method for UCI transmission provided in the second aspect or any implementation mode in the second aspect.

According to a ninth aspect of the embodiments of the disclosure, a system for UCI transmission is provided, which includes a terminal device and an access network device. The terminal device includes the device for UCI transmission provided in the third aspect or optional implementation mode in the third aspect. The access network device includes the device for UCI transmission provided in the fourth aspect or any implementation mode in the fourth aspect.

According to a tenth aspect of the embodiments of the disclosure, a system for UCI transmission is provided, which includes a terminal device and an access network device. The terminal device is the terminal device provided in the fifth aspect or any implementation mode in the fifth aspect. The access network device is the access network device provided in the sixth aspect or any implementation mode in the sixth aspect.

The technical solutions provided in the embodiments of the disclosure have the following beneficial effects. When the first SR and the uplink information need to be sent in the target time unit, the terminal device simultaneously sends the uplink information and the second SR to the access network device on the physical resource in the target time unit. Therefore, the terminal device may transmit the uplink information and the second SR on the dedicated physical resource for transmission of the first SR or the uplink information, thereby improving a utilization rate of the dedicated physical resource in an LTE system.

Multiple terms involved in the embodiments of the disclosure are introduced.

1: UCI, including an SR and uplink information.

2: First SR, used for indicating an uplink logical channel containing data to be sent in multiple uplink logical channels. The first SR is used for indicating the specific uplink logical channels containing the data to be sent to a base station. The uplink logical channels containing the data to be sent are a subset of all uplink logical channels in a terminal. In at least one embodiment of the disclosure, the first SR is an SR that is required to be sent in a target time unit but is actually not sent.

3: Second SR, used for indicating whether there is uplink data to be sent in the multiple uplink logical channels. The second SR does not always indicate the specific uplink logical channels containing the data to be sent to the base station, and may only indicate the base station that there is the uplink data to be sent in the terminal. In at least one embodiment of the disclosure, the second SR is an SR that is actually sent and/or implicitly indicated by the terminal device on a physical resource in the target time unit, or, the second SR is an SR that is determined by an access network device when receiving the uplink information on the physical resource in the target time unit and corresponds to the physical resource.

4: Uplink information, including at least one of feedback response information, channel state information (CSI) or uplink service data. The feedback response information includes an Acknowledgement (ACK) and a Non-Acknowledgement (NACK). The ACK is used for indicating that the access network device has correctly received the uplink data sent by the terminal device, and the NACK is used for indicating that the access network device does not correctly receive the uplink data sent by the terminal device. The CSI is channel state information of an uplink channel for transmission to the base station by the terminal device, and is used for indicating a channel state of the uplink channel of the terminal device.

Part of related terms involved in the embodiments of the disclosure may refer to corresponding related descriptions in the 3rd Generation Partnership Project (3GPP) protocol, for example, the ACK/NACK, the CSI and the uplink service data, and will not be elaborated herein.

Referring to FIG. 1, a structure diagram of a mobile communication system according to an exemplary embodiment of the disclosure is illustrated. The mobile communication system may be an LTE system, and may also be a 5th-Generation (5G) system. The 5G system is also called a New Radio (NR) system. There are no limits made thereto in the embodiment. The mobile communication system includes an access network device 120 and a terminal device 140.

The access network device 120 may be a base station. The base station may be configured to mutually convert a received radio frame and an Internet Protocol (IP) packet, and may further coordinate for attribute management of an air interface. For example, the base station may be an evolutional Node B (eNB or e-NodeB) in LTE, or, a base station adopting a central distributed architecture in the 5G system. The access network device 120, when adopting the central distributed architecture, usually includes a Central Unit (CU) and at least two Distributed Units (DUs). The CU includes protocol stacks of a Packet Data Convergence Protocol (PDCP) layer, an Radio Link Control (RLC) layer and a MAC layer. The DU includes protocol stacks of a physical layer (PHY). A specific implementation manner of the access network device 120 is not limited in the embodiment of the disclosure. In at least one embodiment, the access network device may further include a Home eNB (HeNB), a relay, a Pico and the like.

The access network device 120 establishes a wireless connection with the terminal device 140 through a wireless air interface. In at least one embodiment, the wireless air interface is a 5G-standard-based wireless air interface, for example, the wireless air interface is NR; or, the wireless air interface may also be a wireless air interface based on a next-generation mobile communication network technology standard of 5G; or, the wireless air interface may also be a wireless air interface based on 4th-Generation (4G) standard (LTE system). The access network device 120 may receive uplink data sent by the terminal device 140 through the wireless connection.

The terminal device 140 may be a device that performs data communication with the access network device 120. The terminal device 140 may communicate with one or more core networks through a Radio Access Network (RAN). The terminal device 140 may be a mobile terminal device, for example, a mobile phone (or called a "cell" phone), and a computer with a mobile terminal device, which may be, for example, a portable, pocket, handheld, computer-embedded or vehicle-mounted mobile device. For example, the terminal device may be a subscriber unit, a subscriber station, a mobile station, a mobile, a remote station, an access point, a remote terminal, an access terminal, a user terminal, a user agent, a user device or UE. In at least one embodiment, the terminal device 140 may also be a relay device, which will not be limited in the embodiment. The terminal device 140 may send the uplink data to the access network device 120 through the wireless connection with the access network device 120.

In at least one embodiment, the access network device 120 pre-configures physical resources in a target time unit for the terminal device 140. When the terminal device 140 needs to send a first SR and uplink information in the target time unit, the terminal device 140 simultaneously sends the uplink information and a second SR to the access network device 120 on the physical resources in the target time unit. In one example, the uplink information and the second SR are sent to the access network device 120 on the same physical resource in the target time unit. In another example, the uplink information and the second SR are simultaneously sent to the access network device 120 on the different physical resource in the target time unit.

It is to be noted that the mobile communication system illustrated in FIG. 1 may include multiple access network devices 120 and/or multiple terminal devices 140. FIG. 1 illustrates one access network device 120 and one terminal device 140 for exemplary description but there are no limits made thereto in the embodiment.

For fully utilizing a physical resource for sending an SR, in the embodiments of the disclosure, the physical resource for sending the first SR is used to send the second SR and the other uplink information simultaneously, or, the physical resource for sending the other uplink information is used to send the second SR and the other uplink information simultaneously. Therefore, the SR is indicated to the access network device and simultaneously the other uplink information can be sent.

Figure 2:
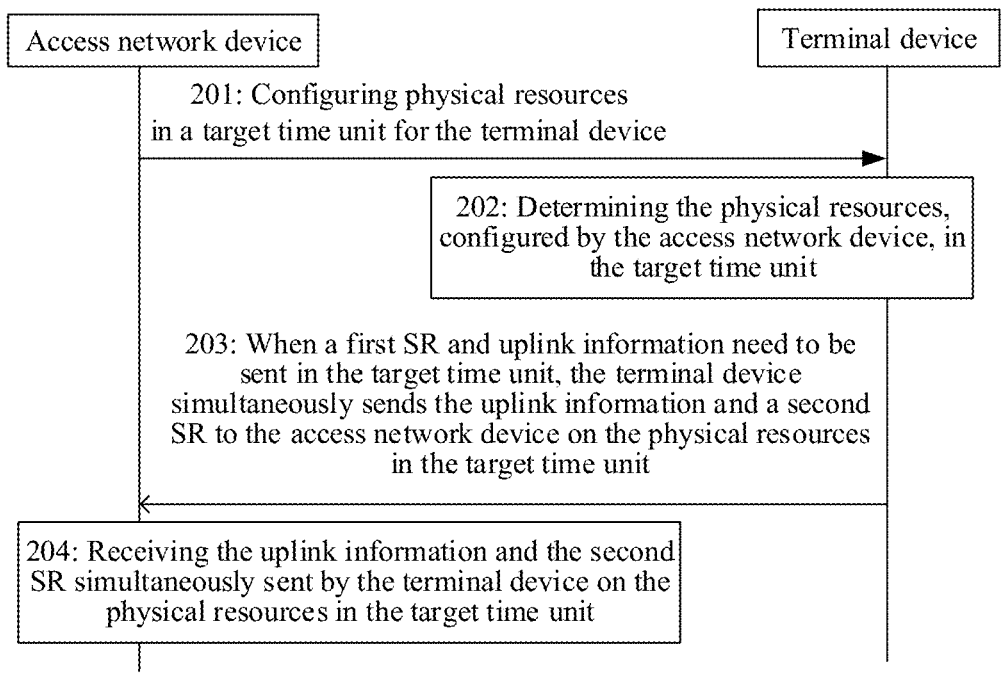
FIG. 2 is a structure diagram of a terminal according to an exemplary embodiment of the disclosure.

Referring to FIG. 2, a flowchart of a method for UCI transmission according to an exemplary embodiment of the disclosure is illustrated. Descriptions are made in the embodiment with application of the method to the mobile communication system illustrated in FIG. 1 as an example. The method includes the following operations.

In 201, an access network device configures physical resources in a target time unit for a terminal device.

In at least one embodiment, the access network device sends configuration information to the terminal device. The configuration information is used for configuring the physical resources for the terminal device. The physical resources are used for sending a first SR and/or uplink information.

In at least one embodiment, the target time unit is a corresponding time unit when the terminal device needs to send the first SR and the uplink information. Schematically, the target time unit may be a symbols, b symbol groups, c slots or d subframes, where a, b, c and d are positive integers. There are no limits made thereto in the embodiment.

In at least one embodiment, the terminal device uses multiple uplink logical channels for data transmission, and parameters of at least two uplink logical channels in the multiple uplink logical channels are different. "Multiple" may be understood as "n", and n is a positive integer. In at least one embodiment, n≥2.

In at least one embodiment, the parameter of the uplink logical channel is used for indicating a transmission requirement of the uplink logical channel, and the parameter of the uplink logical channel includes at least one of a transmission time interval (TTI), a subcarrier spacing, a delay or reliability. In at least one embodiment, at least one parameter is measured by priority. Schematically, the TTI is measured by millisecond (ms) or Orthogonal Frequency Division Multiplexing (OFDM), for example, a time length of a TTI is 0.5 ms, or 7 symbols, 4 symbols, 3 symbols or 2 OFDM symbols. The subcarrier spacing is measured by kHz. The reliability may be measured by a packet loss rate. Alternatively, both the delay and the reliability are measured by a Quality of Service (QoS) priority. The type and measurement manner of the parameter of the uplink logical channel are not limited in the embodiment.

In 202, the terminal device determines the physical resources, configured by the access network device, in the target time unit.

In at least one embodiment, the terminal device receives the configuration information sent by the access network device, and determines the physical resources in the target time unit according to the configuration information.

In 203, when a first SR and uplink information need to be sent in the target time unit, the terminal device simultaneously sends the uplink information and a second SR to the access network device on the physical resources in the target time unit.

In at least one embodiment, the first SR is an SR that is not actually generated by the terminal device or an SR that is generated by the terminal device but not sent to the access network device. Schematically, the first SR is 2 bit information. When a value of the first SR is "00", it is indicated that data to be sent is in an uplink logical channel 1. When the value of the first SR is "01", it is indicated that the data to be sent is in a logical channel 2. When the value of the first SR is "10", it is indicated that the data to be sent is in a logical channel 3. When the value of the first SR is "11", it is indicated that the data to be sent is in a logical channel 4.

The number of physical resources required for transmission of the first SR is greater than the number of physical resources required for transmission of the second SR.

In at least one embodiment, the second SR is 1 bit information. When a value of the 1 bit information is a first preset value, it is indicated that there is uplink data to be sent on the multiple uplink logical channels, and when the value of the 1 bit information is a second preset value, it is indicated that there is no uplink data to be sent on the multiple uplink logical channels.

For example, the target time unit is a slot. When the first scheduling request SR1 and the uplink information X1 need to be sent in the slot, the terminal device simultaneously sends the uplink information X1 and the second scheduling request SR2 to the access network device on the physical resources in the slot. When the value of the second scheduling request SR2 is the first preset value "1", it is indicated to the access network device that there is uplink data to be sent on the multiple uplink logical channels of the terminal device.

In 204, the access network device receives the uplink information and the second SR simultaneously sent by the terminal device on the physical resources in the target time unit.

In at least one embodiment, the access network device, after receiving the uplink information and the second SR on the physical resources in the target time unit, determines a set of parameters according to parameters of the multiple uplink logical channels of the terminal device, and configures physical resources for transmission of the uplink data for the terminal device according to the set of parameters.

According to the embodiments of the disclosure, when the first SR and the uplink information need to be sent in the target time unit, the terminal device simultaneously sends the uplink information and the second SR to the access network device on the physical resources in the target time unit. Therefore, the terminal device may transmit the uplink information and the second SR on the dedicated physical resources for transmission of the first SR or the uplink information, thereby improving a utilization rate of the dedicated physical resources in an LTE system.

It is to be noted that the physical resources, configured by the access network device for the terminal device, in the target time unit include a first type of physical resources and/or a second type of physical resources. The first type of physical resources is physical resources for transmission of the first SR, and the second type of physical resources is physical resources for transmission of the uplink information. The embodiment illustrated in FIG. 3 describes a process that the terminal device simultaneously transmits the uplink information and the second SR by use of the first type of physical resources, and the embodiment illustrated in FIG. 4 describes a process that the terminal device simultaneously transmits the uplink information and the second SR by use of the second type of physical resources.

Figure 3:
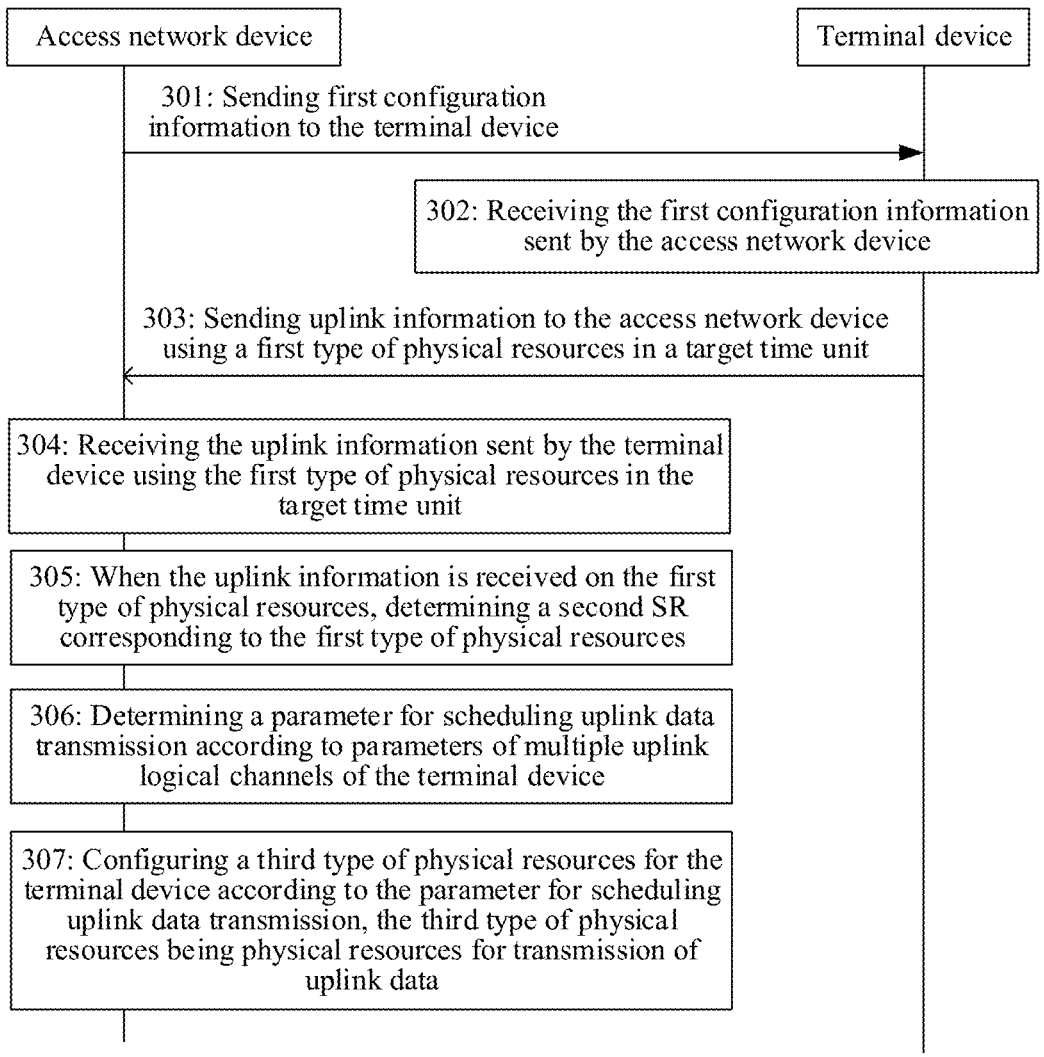
FIG. 3 is a flowchart of a method for UCI transmission according to an exemplary embodiment of the disclosure.

Referring to FIG. 3, a flowchart of a method for UCI transmission according to an exemplary embodiment of the disclosure is illustrated. The method is applied to the mobile communication system illustrated in FIG. 1. The method includes the following operations.

In 301, an access network device sends first configuration information to a terminal device.

The first configuration information is used for configuring a first type of physical resources for the terminal device, and the first type of physical resources is physical resources for transmission of a first SR. In other words, the first type of physical resources is physical resources configured by the access network device for the terminal device to transmit the first SR, but the terminal device does not use the physical resources to transmit the first SR.

In 302, the terminal device receives the first configuration information sent by the access network device.

In 303, the terminal device sends uplink information to the access network device using a first type of physical resources in a target time unit.

In at least one embodiment, the first type of physical resource is a 2 bit physical resource, and first uplink information transmitted by the first type of physical resource is 2 bit information.

In such case, the uplink information is sent on the first type of physical resources, and is further used to implicitly indicate the second SR.

In 304, the access network device receives the uplink information sent by the terminal device using the first type of physical resources in the target time unit.

In 305, the access network device, when receiving the uplink information on the first type of physical resources, determines a second SR corresponding to the first type of physical resources.

The second SR is used for indicating that there is uplink data to be sent in the terminal device.

In at least one embodiment, when the physical resource adopted by the terminal device to send the uplink information to the access network device is the first type of physical resource and the access network device receives the uplink information on the first type of physical resource, the access network device determines that there is uplink data to be sent in the terminal device.

For example, the terminal device uses 3 uplink logical channels for data transmission, and the terminal device sends the uplink information X1 to the access network device using the first type of physical resource S. The access network device, when receiving the uplink information X1 on the first type of physical resource S, determines that the terminal device further indicates the second SR, and the second SR indicates that data to be sent is carried in one or more uplink logical channels of the terminal device.

In 306, the access network device determines a parameter used for scheduling uplink data transmission according to parameters of multiple uplink logical channels of the terminal device.

In at least one embodiment, each uplink logical channel corresponds to respective parameters. Descriptions are made with the condition that each logical channel corresponds to m (m is a positive integer) types of parameters as an example. Determination of the parameter used for scheduling uplink data transmission includes, but not limited to, the following two methods.

A first possible determination method: the access network device, for each type of parameter, determines a parameter simultaneously meeting transmission requirements of the multiple uplink logical channels as the parameter used for scheduling uplink data transmission according to a priority of the parameter corresponding to the uplink logical channel containing data to be sent.

For example, the parameter of the uplink logical channel includes a TTI, a subcarrier spacing, a delay and a packet loss rate, and there are 3 uplink logical channels containing data to be sent, i.e., channel 1, channel 2 and channel 3. The parameters of the three uplink logical channels are illustrated in Table 2. The parameter of the channel 1 includes the TTI "1 ms", the subcarrier spacing "15 kHz", the delay "100 ms" and the packet loss rate "10%". The parameter of the channel 2 includes the TTI "0.5 ms", the subcarrier spacing "30 kHz", the delay "50 ms" and the packet loss rate "1%". The parameter of the channel 3 includes the TTI "0.25 ms", the subcarrier spacing "60 kHz", the delay "25 ms" and the packet loss rate "1%". Therefore, the access network device determines three parameters simultaneously meeting the transmission requirements of the multiple uplink logical channels, i.e., the shortest TTI "0.25 ms", the largest subcarrier spacing "60 kHz", the shortest delay "25 ms" and the highest reliability "1%", and combines these parameters into the parameter used for scheduling uplink data transmission.

TABLE 2

|  | Channel 1 | Channel 2 | Channel 3 | Parameter for scheduling uplink data transmission |
|---|---|---|---|---|
| TTI | 1 ms | 0.5 ms | 0.25 ms | 0.25 ms |
| Subcarrier spacing | 15 kHz | 30 kHz | 60 kHz | 60 kHz |
| Delay | 100 ms | 50 ms | 25 ms | 25 ms |
| Packet loss rate | 10% | 1% | 1% | 1% |

A second possible determination method: the access network device determines the uplink logical channel most strictly consistent with a preset condition as a target logical channel and determines the parameter corresponding to the target logical channel as the parameter used for scheduling uplink data transmission. The preset condition includes at least one of the following that the TTI is shortest, the subcarrier spacing is greatest, the delay is shortest, or the reliability is highest.

According to the parameters, illustrated in Table 2, of the three uplink logical channels, the access network device determines the channel 3 meeting the preset condition "the delay is shortest" as the target logical channel, and determines the parameter (the TTI "0.25 ms", the subcarrier spacing "60 kHz", the delay "25 ms" and the packet loss rate "1%") corresponding to the channel 3 as the parameter for scheduling uplink data transmission. The determination manner for the parameter for scheduling uplink data transmission is not limited in the embodiment.

In 307, the access network device configures a third type of physical resources for the terminal device according to the parameter used for scheduling uplink data transmission, and the third type of physical resources is physical resources for transmission of uplink data.

In at least one embodiment, the access network device, according to the parameter for scheduling uplink data transmission, configures the third type of physical resources for transmission of the uplink data, and/or a modulation and coding level, and/or sending power and/or pre-coding information for the terminal device.

According to the embodiments of the disclosure, when the first SR and the uplink information are required to be sent in the target time unit, the terminal device simultaneously sends the uplink information and the second SR to the access network device on the physical resources in the target time unit. Therefore, the terminal device may simultaneously send the SR and the uplink information, thereby improving transmission efficiency of uplink control signaling.

It is to be noted that the first type of physical resources includes multiple first physical resources, and the multiple first physical resources have a correspondence with the multiple uplink logical channels. Each first physical resource may correspond to one or more logical channels. Each logical channel may be mapped to zero or one first physical resource. Specifically, the correspondence between the first physical resources and the uplink logical channels includes the following three possible correspondences.

A first possible correspondence: one first physical resource corresponds to one uplink logical channel. The correspondence is pre-configured and stored by the access network device, and the correspondence is illustrated in Table 3. The first type of physical resources includes a first physical resource S1, a first physical resource S2, a first physical resource S3 and a first physical resource S4. When the terminal uses the first physical resource S1, it is indicated that the uplink data to be sent is in the uplink logical channel 1. When the terminal uses the first physical resource S2, it is indicated that the uplink data to be sent is in the uplink logical channel 2. When the terminal uses the first physical resource S3, it is indicated that the uplink data to be sent is in the uplink logical channel 3. When the terminal uses the first physical resource S4, it is indicated that the uplink data to be sent is in the uplink logical channel 4.

TABLE 3

| First physical resource | Uplink logical channel |
| --- | --- |
| First physical resource S1 | Uplink logical channel 1 |
| First physical resource S2 | Uplink logical channel 2 |
| First physical resource S3 | Uplink logical channel 3 |
| First physical resource S4 | Uplink logical channel 4 |

A second possible correspondence: each uplink logical channel is mapped to multiple first physical resources, i.e., one uplink logical channel is mapped to more first physical resources. The correspondence is pre-configured and stored by the access network device, and the correspondence is illustrated in Table 4. The first type of physical resources includes the first physical resource S1, the first physical resource S2 and the first physical resource S3. When the terminal uses the first physical resource S1, it is indicated that the uplink data to be sent is in the uplink logical channel 1. When the terminal uses the first physical resource S2, it is indicated that the uplink data to be sent is in the uplink logical channel 2. When the terminal uses the first physical resource S3, it is indicated that the uplink data to be sent is in the uplink logical channel 1 and the uplink logical channel 2.

TABLE 4

| Uplink logical channel | First physical resource |
| --- | --- |
| Uplink logical channel 1 | First physical resource S1 |
| Uplink logical channel 2 | First physical resource S2 |
| Uplink logical channels 1 and 2 | First physical resource S3 |

A third possible correspondence: each first physical resource corresponds to multiple uplink logical channels, i.e., one first physical resource corresponds to more uplink logical channels. The correspondence is pre-configured and stored by the access network device, and the correspondence is illustrated in Table 5. The first type of physical resources includes the first physical resource S1 and the first physical resource S2. When the terminal uses the first physical resource S1, it is indicated that the uplink data to be sent is in the uplink logical channel 1 and/or the uplink logical channel 2. When the terminal uses the first physical resource S2, it is indicated that the uplink data to be sent is in the uplink logical channel 3 and/or the uplink logical channel 4. For example, the first physical resource S1 is 1 bit information, a value of 0 indicates that the data to be sent is in the uplink logical channel 1, and a value of 1 indicates that the data to be sent is in the uplink logical channel 2.

TABLE 5

| First physical resource | Uplink logical channel |
| --- | --- |
| First physical resource S1 | Uplink logical channel 1 |
|  | Uplink logical channel 2 |
| First physical resource S2 | Uplink logical channel 3 |
|  | Uplink logical channel 4 |

The correspondence between the multiple first physical resources and the multiple uplink logical channels is only schematic and all solutions obtained by those skilled in the art in combination with conventional technical means on the basis of each abovementioned possible implementation mode shall fall within the scope of protection of the disclosure.

In at least one embodiment, based on the third possible correspondence illustrated in Table 5, a fourth possible correspondence may be provided, and the correspondence is illustrated in Table 6. For example, the first physical resource S3 is 1 bit information. When a value is 0, it is indicated that the data to be sent is in the uplink logical channel 1 and the uplink logical channel 2, and when the value is 1, it is indicated that the data to be sent is in the uplink logical channel 1 and the uplink logical channel 3.

TABLE 6

| First physical resource | 1 bit information | Uplink logical channel |
| --- | --- | --- |
| First physical resource S1 | 0 | Uplink logical channel 1 |
| | 1 | Uplink logical channel 2 |
| First physical resource S2 | 0 | Uplink logical channel 3 |
| | 1 | Uplink logical channel 4 |
| First physical resource S3 | 0 | Uplink logical channels 1 and 2 |
| | 1 | Uplink logical channels 1 and 3 |
| First physical resource S5 | 0 | Uplink logical channels 1 and 4 |
| | 1 | Uplink logical channels 2 and 3 |
| First physical resource S7 | 0 | Uplink logical channels 2 and 4 |
| | 1 | Uplink logical channels 3 and 4 |
| First physical resource S9 | 0 | Uplink logical channels 1, 2 and 3 |
| | 1 | Uplink logical channels 1, 2 and 4 |
| First physical resource S11 | 0 | Uplink logical channels 1, 3 and 4 |
| | 1 | Uplink logical channels 2, 3 and 4 |

Figure 4:
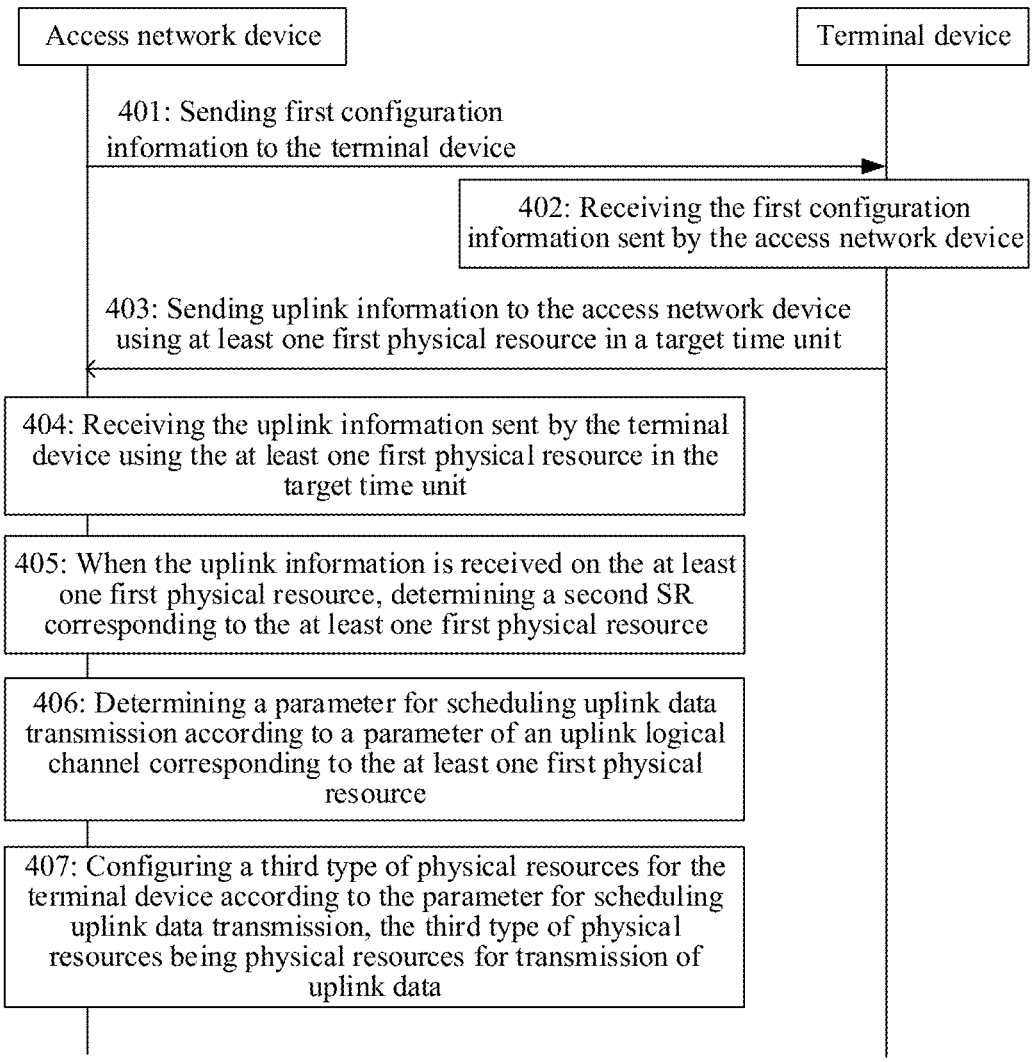
FIG. 4 is a flowchart of a method for UCI transmission according to another exemplary embodiment of the disclosure.

Referring to FIG. 4, a flowchart of a method for UCI transmission according to another exemplary embodiment of the disclosure is illustrated. The method is applied to the mobile communication system illustrated in FIG. 1. The method includes the following operations.

In 401, an access network device sends first configuration information to a terminal device.

The first configuration information is used for configuring a first type of physical resources for the terminal device. The first type of physical resources includes multiple first physical resources, and the multiple first physical resources have a correspondence with multiple uplink logical channels.

In 402, the terminal device receives the first configuration information sent by the access network device.

In 403, the terminal device sends uplink information to the access network device using at least one first physical resource in a target time unit.

In at least one embodiment, the first type of physical resources includes the multiple first physical resources. Each first physical resource is a 2 bit physical resource, and the uplink information transmitted by use of the first physical resource is 2 bit information.

The operation that the terminal device sends the uplink information to the access network device using the at least one first physical resource in the target time unit includes, but not limited to, the following two possible implementation modes.

In a first possible implementation mode, the terminal device sends the uplink information to the access network device by use of a first physical resource in the target time unit.

For example, the first type of physical resources includes a first physical resource S1 and a first physical resource S2, and the access network device pre-configures that the first physical resource S1 has a correspondence with an uplink logical channel 1 and an uplink logical channel 2 and that the first physical resource S2 has a correspondence with an uplink logical channel 3 and an uplink logical channel 4. The terminal device sends the uplink information to the access network device by use of the first physical resource S1 in the target time unit.

In a second possible implementation mode, the terminal device sends the uplink information to the access network device by use of at least two first physical resources in the target time unit. The same uplink information is transmitted in each first physical resource.

For example, the first type of physical resources includes the first physical resource S1 and the first physical resource S2, and the access network device pre-configures that the first physical resource S1 has the correspondence with the uplink logical channel 1 and the uplink logical channel 2 and that the first physical resource S2 has the correspondence with the uplink logical channel 3 and the uplink logical channel 4. The terminal device sends the uplink information X1 to the access network device by use of the first physical resource S1 in the target time unit and, meanwhile, further sends the uplink information X1 to the access network device by use of the first physical resource S2 in the target time unit.

In at least one embodiment, the at least one first physical resource used by the terminal device to transmit the uplink information includes a physical resource corresponding to a first logical channel. The first logical channel is an uplink logical channel determined by the terminal device according to a priority of parameters corresponding to the uplink logical channels containing data to be sent. Schematically, the priority of the parameters corresponding to the uplink logical channel is predetermined in a protocol.

In at least one embodiment, the first logical channel determined by the terminal device according to the priority of the parameters corresponding to the uplink logical channels containing the data to be sent is an uplink logical channel with a highest transmission requirement. The first logical channel meets at least one of the following parameter conditions: a TTI is shortest, a subcarrier spacing is smallest, a delay is shortest or reliability is highest.

For example, the uplink logical channels containing the data to be sent include the uplink logical channel 1 and the uplink logical channel 2, the uplink logical channel 1 corresponds to the physical resource S1, and the uplink logical channel 2 corresponds to the physical resource S2. If the uplink logical channel 1 meets the above parameter conditions, namely the uplink logical channel 1 is the first logical channel, the at least one first physical resource S adopted by the terminal device to send the uplink information to the access network device includes the physical resource S1 corresponding to the logical channel 1.

In 404, the access network device receives the uplink information sent by the terminal device using the at least one first physical resource in the target time unit.

In 405, the access network device, when receiving the uplink information on the at least one first physical resource, determines a second SR corresponding to the at least one first physical resource.

The second SR is used for indicating that uplink data to be sent is in the uplink logical channel corresponding to the at least one first physical resource.

In at least one embodiment, the terminal device adopts the first possible implementation mode in 403 to send the uplink information to the access network device. Correspondingly, the access network device, when receiving the uplink information on the first physical resource, determines that the uplink data to be sent exists in the uplink logical channel corresponding to the first physical resource.

For example, the access network device, when receiving the uplink information X1 on the first physical resource S1, determines that the uplink data to be sent is in the uplink logical channel 1 and/or uplink logical channel 2 corresponding to the first physical resource S1. In at least one embodiment, the terminal device adopts the second possible implementation mode in 403 to send the uplink information to the access network device. Correspondingly, the access network device, when receiving the uplink information on the at least two physical resources, determines that the uplink data to be sent is in the uplink logical channels corresponding to the at least two physical resources.

For example, the access network device, when receiving the uplink information X1 on the first physical resource S1, determines that the uplink data to be sent is in the uplink logical channel 1 and/or uplink logical channel 2 corresponding to the first physical resource S1; and/or, the access network device, when receiving the uplink information X1 on the first physical resource S2, determines that the uplink data to be sent is in the uplink logical channel 3 and/or uplink logical channel 4 corresponding to the first physical resource S2.

In 406, the access network device determines a parameter used for scheduling uplink data transmission according to a parameter of an uplink logical channel corresponding to the at least one first physical resource.

In at least one embodiment, each uplink logical channel corresponds to respective parameters. Descriptions are made with the condition that each logical channel corresponds to m (m is a positive integer) types of parameters as an example. Determination of the parameter for scheduling uplink data transmission may include, but not limited to, several possible implementation modes as follows.

A possible implementation mode is based on the correspondence illustrated in Table 3, namely each first physical resource is in one-to-one correspondence with an uplink logical channel. If the terminal device sends the uplink data to the access network device by use of a first physical resource, the access network device determines a parameter of the uplink logical channel corresponding to the first physical resource as the parameter for scheduling uplink data transmission.

For example, if the terminal device sends the uplink data to the access network device by use of the first physical resource S1, the access network device determines the parameter (a TTI "0.25 ms", a subcarrier spacing "60 kHz", a delay "25 ms" and a packet loss rate "1%") of the uplink logical channel 1 corresponding to the first physical resource S1 as the parameter for scheduling uplink data transmission.

Another possible implementation mode is based on the correspondence illustrated in Table 3, namely each first physical resource is in one-to-one correspondence with an uplink logical channel. If the terminal device sends the uplink data to the access network device by use of at least two first physical resources, the access network device determines the parameter for scheduling uplink data transmission according to parameters of the uplink logical channels corresponding to the at least two first physical resources. Specific implementation may make reference to the determination method for determining the parameter for scheduling uplink data transmission in the embodiment illustrated in FIG. 3, while will not be elaborated herein.

Another possible implementation mode is based on the correspondence illustrated in Table 4, namely each uplink logical channel has a correspondence with multiple first physical resources. If the terminal device sends the uplink data to the access network device by use of a first physical resource, the access network device determines the parameter of the uplink logical channel corresponding to the first physical resource as the parameter for scheduling uplink data transmission.

For example, if the terminal device sends the uplink data to the access network device by use of the first physical resource S2, the access network device determines the parameter (the TTI "0.5 ms", the subcarrier spacing "30 kHz", the delay "50 ms" and the packet loss rate "1%") of the uplink logical channel 2 corresponding to the first physical resource S2 as the parameter for scheduling uplink data transmission.

Another possible implementation mode is based on the correspondence illustrated in Table 4, namely each uplink logical channel has a correspondence with multiple first physical resources. If the terminal device sends the uplink data to the access network device by use of at least two first physical resources, the access network device determines the parameter for scheduling uplink data transmission according to the parameters of the uplink logical channels corresponding to the at least two first physical resources. Specific implementation may make reference to the determination method for determining the parameter for scheduling uplink data transmission in the embodiment illustrated in FIG. 3, while will not be elaborated herein.

Another possible implementation mode is based on the correspondence illustrated in Table 5, namely each first physical resource has a correspondence with multiple uplink logical channels. If the terminal device sends the uplink data to the access network device by use of at least one first physical resource, the access network device determines the parameter for scheduling uplink data transmission according to the parameters of the uplink logical channels corresponding to the at least one first physical resource. Specific implementation may make reference to the determination method for determining the parameter for scheduling uplink data transmission in the embodiment illustrated in FIG. 3, while will not be elaborated herein.

In 407, the access network device configures a third type of physical resources for the terminal device according to the parameter for scheduling uplink data transmission, and the third type of physical resources is physical resources for transmission of uplink data.

In at least one embodiment, the access network device configures the third type of physical resources for transmission of the uplink data for the terminal device according to the parameter for scheduling uplink data transmission. The third type of physical resources is i-bit physical resources, and i is a positive integer greater than 1.

According to the embodiment of the disclosure, when the first SR and the uplink information are required to be sent in the target time unit, the terminal device simultaneously sends the uplink information and the second SR to the access network device on the physical resources in the target time unit. Therefore, the terminal device may transmit the uplink information and the second SR on the dedicated physical resources for transmission of the first SR or the uplink information, and a utilization rate of the dedicated physical resources in an LTE system is improved.

According to the embodiment of the disclosure, the access network device further configures the first type of physical resources for transmission of the first SR for the terminal device, and the terminal device sends the uplink information to the access network device by use of the first type of physical resources in the target time unit. Therefore, the terminal device may transmit the uplink information on the dedicated physical resources for transmission of the first SR, and the utilization rate of the dedicated physical resources in the LTE system is improved.

According to the embodiment of the disclosure, the multiple first physical resources have the correspondence with the multiple uplink logical channels. The access network device, when receiving the uplink information on the first type of physical resources, may determine the second SR and further determine that the uplink data to be sent is in the terminal device indicated by the second SR, so that the first physical resource may implicitly indicate the second SR.

Figure 5:
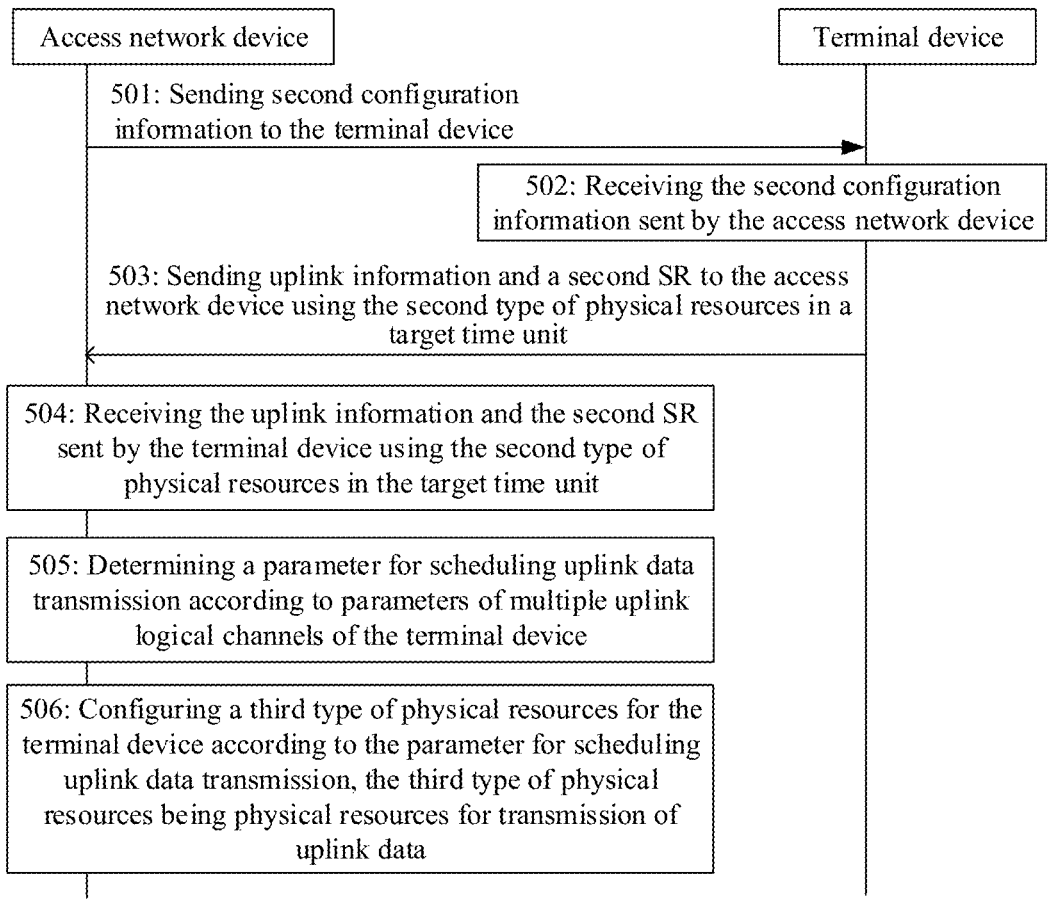
FIG. 5 is a flowchart of a method for UCI transmission according to another exemplary embodiment of the disclosure.

Referring to FIG. 5, a flowchart of a method for UCI transmission according to an exemplary embodiment of the disclosure is illustrated. The method is applied to the mobile communication system illustrated in FIG. 1. The method includes the following operations.

In 501, an access network device sends second configuration information to a terminal device.

The second configuration information is used for configuring a second type of physical resources for the terminal device, and the second type of physical resources is physical resources for transmission of uplink information.

In 502, the terminal device receives the second configuration information sent by the access network device.

In 503, the terminal device sends the uplink information and a second SR to the access network device using the second type of physical resources in a target time unit.

The second type of physical resources is physical resources configured by the access network device for the terminal device to perform transmission of the uplink information. In at least one embodiment, the second type of physical resource is a P-bit physical resource, the uplink information transmitted by use of the second type of physical resource is P-1-bit information, and the second SR transmitted by use of the second type of physical resource is 1 bit information, where P is a positive integer greater than 1.

In at least one embodiment, the second SR is 1 bit information. When a value of the 1 bit information is a first preset value (for example, "1"), it is indicated that uplink data to be sent is in multiple uplink logical channels. When the value of the 1 bit information is a second preset value (for example, "0"), it is indicated that there is no uplink data to be sent in the multiple uplink logical channels.

Schematically, the terminal device, when determining the 1 bit second SR, cascades and jointly codes the 1 bit second SR and the P-1-bit uplink information. After the uplink information and the second SR are coded, the terminal device sends the uplink information and the second SR to the access network device by use of the second type of physical resource in the target time unit.

For example, if the second SR is 1 bit information "1" and the uplink information is 4 bit information "1010", the terminal device sends 5 bit information "10101" to the access network device using the second type of physical resource T.

In 504, the access network device receives the uplink information and the second SR sent by the terminal device using the second type of physical resources in the target time unit.

In at least one embodiment, the access network device, after receiving the 5 bit information "10101" sent by the terminal device using the second type of physical resource in the target time unit, determines the uplink information "1010" and the second SR "1". The second SR "1" is used for indicating the access network device that uplink data to be sent is the multiple uplink logical channels of the terminal device.

In 505, the access network device determines a parameter for scheduling uplink data transmission according to parameters of multiple uplink logical channels of the terminal device.

In at least one embodiment, each uplink logical channel corresponds to respective parameters. Descriptions are made with the condition that each logical channel corresponds to m (m is a positive integer) types of parameters as an example. Determination of the parameter for scheduling uplink data transmission includes, but not limited to, two possible determination methods. Specific implementation may make reference to the determination method for determining the parameter for scheduling uplink data transmission in the embodiment illustrated in FIG. 3, which will not be elaborated herein.

In 506, the access network device configures a third type of physical resources for the terminal device according to the parameter for scheduling uplink data transmission, and the third type of physical resources is physical resources for transmission of uplink data.

In at least one embodiment, the access network device configures the third type of physical resources for transmission of the uplink data for the terminal device according to the parameter for scheduling uplink data transmission. The third type of physical resource is an i-bit physical resource, where i is a positive integer greater than 1.

According to the embodiment of the disclosure, when the first SR and the uplink information are required to be sent in the target time unit, the terminal device simultaneously sends the uplink information and the second SR to the access network device on the physical resource in the target time unit. Therefore, the terminal device may transmit the uplink information and the second SR on the dedicated physical resource for transmission of the first SR or the uplink information, thereby improving a utilization rate of the dedicated physical resource in an LTE system.

According to the embodiment of the disclosure, the access network device further configures the second type of physical resources for transmission of the uplink information for the terminal device, and the terminal device sends the uplink information and the second SR to the access network device using the second type of physical resource in the target time unit. Therefore, the terminal device may transmit the uplink information and the second SR on the dedicated physical resource for transmission of the uplink information, thereby improving the utilization rate of the dedicated physical resource in the LTE system.

The below is the device embodiments of the disclosure. The content that is not elaborated in the device embodiments may make reference to technical details disclosed in the method embodiments.

Figure 6:
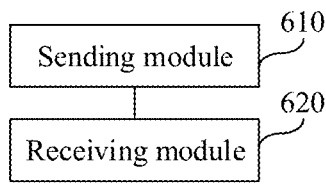
FIG. 6 is a structure diagram of a device for UCI transmission according to an exemplary embodiment of the disclosure.

Referring to FIG. 6, a structure diagram of a device for UCI transmission according to an embodiment of the disclosure is illustrated. The device for UCI transmission may be implemented into all or part of a terminal device through software, hardware and a combination of the two. The device for UCI transmission includes a sending module 610 and a receiving module 620.

The sending module 610 is configured to implement the operation in 203.

The receiving module 620 is configured to implement the operation in 202.

In at least one embodiment provided based on the embodiment illustrated in FIG. 6, the sending module 610 is further configured to implement the operation in 303 or the operation in 403, and the receiving module 620 is further configured to implement the operation in 302 or the operation in 402.

In at least one embodiment provided based on the embodiment illustrated in FIG. 6, the sending module 610 is further configured to implement the operation in 503, and the receiving module 620 is further configured to implement the operation in 502.

Related details may make reference to the method embodiments illustrated in FIG. 1 to FIG. 5. The sending module 610 is further configured to realize any other implied or disclosed function related to a sending operation in the method embodiments, and the receiving module 620 is further configured to realize any other implied or disclosed function related to a receiving operation in the method embodiments.

Figure 7:
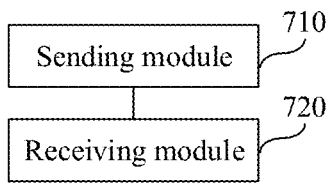
FIG. 7 is a structure diagram of a device for UCI transmission according to another exemplary embodiment of the disclosure.

Referring to FIG. 7, a structure diagram of a device for UCI transmission according to an embodiment of the disclosure is illustrated. The device for UCI transmission may be implemented into all or part of an access network device through software, hardware and a combination of the two. The device for UCI transmission includes a sending module 710 and a receiving module 720.

The sending module 710 is configured to implement the operation in 201 or the operation in 301 or the operation in 401.

The receiving module 720 is configured to implement the operation in 204.

In at least one embodiment provided based on the embodiment illustrated in FIG. 7, the receiving module 720 is further configured to implement the operation in 304 and the operation in 305.

In at least one embodiment provided based on the embodiment illustrated in FIG. 7, the receiving module 720 is further configured to implement the operation in 404 and the operation in 405.

Related details may make reference to the method embodiments illustrated in FIG. 1 to FIG. 5. The sending module 710 is further configured to realize any other implied or disclosed function related to a sending operation in the method embodiments, and the receiving module 720 is further configured to realize any other implied or disclosed function related to a receiving operation in the method embodiments.

Figure 8:
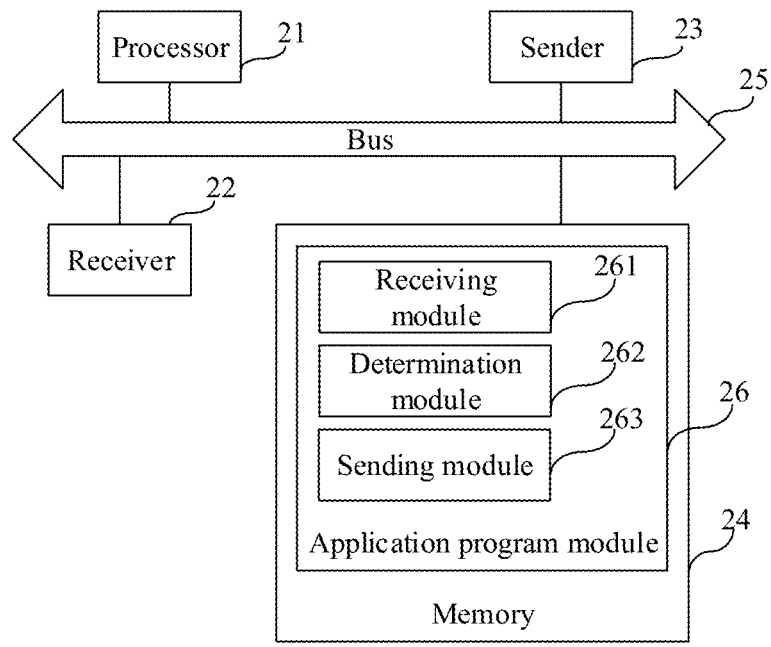
FIG. 8 is a structure diagram of a terminal device according to an exemplary embodiment of the disclosure.

Referring to FIG. 8, a structure diagram of a terminal device according to an exemplary embodiment is illustrated. The terminal may be the terminal device 140 in the mobile communication system illustrated in FIG. 1. Descriptions are made in the embodiment with the condition that the terminal device 140 is UE in an LTE system or a 5G system as an example. The terminal device includes a processor 21, a receiver 22, a sender 23, a memory 24 and a bus 25.

The processor 21 includes one or more processing cores. The processor 21 runs software programs and modules to execute various function applications and information processing.

The receiver 22 and the sender 23 may be implemented into a communication component, the communication component may be a communication chip, and the communication chip may include a receiving module, a transmitting module, a modem module and the like. The communication chip may be configured to modulate and/or demodulate information and receive or send the information through a wireless signal.

The memory 24 is connected with the processor 21 through the bus 25.

The memory 24 may be configured to store the software programs and the modules.

The memory 24 may store an application program module 26 for at least one function. The application program module 26 may include a receiving module 261, a determination module 262 and a sending module 263.

The processor 21 is configured to, when a first SR and uplink information are need to be sent in a target time unit, simultaneously send the uplink information and a second SR to an access network device on a physical resource in the target time unit.

The terminal device uses multiple uplink logical channels for data transmission, the first SR is used for indicating an uplink logical channel containing data to be sent in the multiple uplink logical channels, the second SR is used for indicating whether there is uplink data to be sent on the multiple uplink logical channels, and parameters of at least two uplink logical channels in the multiple uplink logical channels are different.

The processor 21 is configured to execute the receiving module 261 to realize a function related to the receiving operation in each method embodiment. The processor 21 is configured to execute the determination module 262 to realize a function related to the determination operation in each method embodiment. The processor 21 is configured to execute the sending module 263 to realize a function related to the sending operation in each method embodiment.

In addition, the memory 24 may be implemented by a volatile or nonvolatile storage device of any type or a combination thereof, for example, a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or an optical disk.

Figure 9:
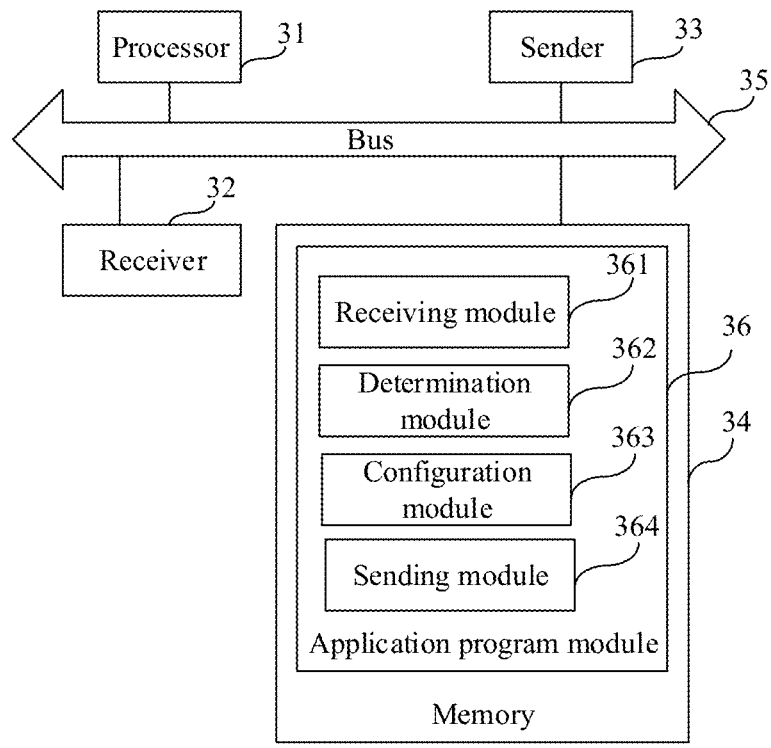
FIG. 9 is a structure diagram of an access network device according to an exemplary embodiment of the disclosure.

Referring to FIG. 9, a structure diagram of an access network device according to an exemplary embodiment is illustrated. The access network device may be the access network device 120 in the mobile communication system illustrated in FIG. 1. Descriptions are made in the embodiment with the condition that the access network device 120 is an eNB in an LTE system or a gNB in a 5G system as an example. The access network device includes a processor 31, a receiver 32, a sender 33, a memory 34 and a bus 35.

The processor 31 includes one or more processing cores. The processor 31 runs software programs and modules to execute various function applications and information processing.

The receiver 32 and the sender 33 may be implemented into a communication component, the communication component may be a communication chip, and the communication chip may include a receiving module, a transmitting module, a modem module and the like. The communication chip may be configured to modulate and demodulate information and receive or send the information through a wireless signal.

The memory 34 is connected with the processor 31 through the bus 35.

The memory 34 may be configured to store the software programs and the modules.

The memory 34 may store an application program module 36 for at least one function. The application program module 36 may include a sending module 361, a determination module 362, a configuration module 363 and a receiving module 364.

The processor 31 is configured to, when a first SR and uplink information need to be received in a target time unit, receive the uplink information and a second SR simultaneously sent by a terminal device on a physical resource in the target time unit.

The terminal device uses multiple uplink logical channels for data transmission, the first SR is used for indicating an logical channel containing data to be sent in the multiple uplink logical channels, the second SR is used for indicating whether there is uplink data to be sent on the multiple uplink logical channels, and parameters of at least two uplink logical channels in the multiple uplink logical channels are different.

The processor 31 is configured to execute the sending module 361 to realize a function related to the sending operation in each method embodiment. The processor 31 is configured to execute the determination module 362 to realize a function related to the determination operation in each method embodiment. The processor 31 is configured to execute the configuration module 363 to realize a function related to the configuration operation in each method embodiment. The processor 31 is configured to execute the receiving module 364 to realize a function related to the receiving operation in each method embodiment.

In addition, the memory 34 may be implemented by a volatile or nonvolatile storage device of any type or a combination thereof, for example, an SRAM, an EEPROM, an EPROM, a PROM, a ROM, a magnetic memory, a flash memory, a magnetic disk or an optical disk.

An embodiment of the disclosure also provides an uplink data system, which may include a terminal device and an access network device.

The terminal device may include the device for UCI transmission provided in FIG. 6, and the access network device may include the device for UCI transmission provided in FIG. 7.

Alternatively, the terminal device may be the terminal device provided in FIG. 8, and the access network device may be the access network device provided in FIG. 9.

Those skilled in the art may realize that, in one or more abovementioned examples, the functions described in the embodiments of the disclosure may be realized through hardware, software, firmware or any combination thereof.

When being realized through the software, these functions may be stored in a computer-readable medium or transmitted as one or more instructions or codes in the computer-readable medium. The computer-readable medium includes a computer storage medium and a communication medium, and the communication medium includes any medium for transmitting a computer program from one place to another place. The storage medium may be any available medium accessible for a universal or dedicated computer.

The above is only the specific embodiments of the disclosure and not intended to limit the disclosure. Any modifications, equivalent replacements, improvements and the like made within the spirit and principle of the disclosure shall fall within the scope of protection of the disclosure.

The invention claimed is:

1. A method for uplink control information transmission, a first type of physical resources in a target time unit being configured for transmission of a first scheduling request (SR), the first type of physical resources comprising multiple first physical resources, and the multiple first physical resources having a correspondence with multiple uplink logical channels, the method comprising:
when uplink information needs to be sent in the target time unit, simultaneously sending, by a terminal device, the uplink information and a second SR to an access network device on a second type of physical resources in the target time unit;
wherein the second type of physical resources is used for transmission of the uplink information, the first SR is used for indicating at least one uplink logical channel carrying data to be sent in the multiple uplink logical channels, the second SR is used for indicating there is uplink data in the terminal device to be sent, the second SR is not used for indicating at least one uplink logical channel carrying data to be sent in the multiple uplink logical channels, and parameters of at least two of the multiple uplink logical channels are different, and wherein
the target time unit is a slot and is not a subframe, and the uplink information comprises feedback response information Acknowledgement (ACK)/Non-Acknowledgement (NACK).

2. The method of claim 1, wherein a parameter of each of the multiple uplink logical channels comprises a transmission time interval (TTI), a subcarrier spacing, a delay and reliability.

3. The method of claim 1, wherein the uplink information further comprises at least one of channel state information (CSI) or uplink service data.

4. The method of claim 1, before simultaneously sending, by the terminal device, the uplink information and the second SR to the access network device on the second type of physical resources in the target time unit, further comprising:
receiving, by the terminal device, second configuration information sent by the access network device, wherein the second configuration information is used for configuring the second type of physical resources for the terminal device.

5. The method of claim 1, wherein the correspondence between the multiple first physical resources and the multiple uplink logical channels comprises one of the following:
each first physical resource corresponds to one uplink logical channel;
each uplink logical channel corresponds to multiple first physical resources; or
each first physical resource corresponds to multiple uplink logical channels.

6. A terminal device, a first type of physical resources in a target time unit being configured for transmission of a first scheduling request (SR), the first type of physical resources comprising multiple first physical resources, and the multiple first physical resources having a correspondence with multiple uplink logical channels, the terminal device comprising a processor connected with a memory, wherein
the processor is configured to, when uplink information needs to be sent in the target time unit, simultaneously send the uplink information and a second SR to an access network device on a second type of physical resources in the target time unit;
wherein the second type of physical resources is used for transmission of the uplink information, the first SR is used for indicating at least one uplink logical channel carrying data to be sent in the multiple uplink logical channels, the second SR is used for indicating there is uplink data in the terminal device to be sent, the second SR is not used for indicating at least one uplink logical channel carrying data to be sent in the multiple uplink logical channels, and parameters of at least two of the multiple uplink logical channels are different, and wherein
the target time unit is a slot and is not a subframe, and the uplink information comprises feedback response information Acknowledgement (ACK)/Non-Acknowledgement (NACK).

7. The terminal device of claim 6, wherein a parameter of each of the multiple uplink logical channels comprises a transmission time interval (TTI), a subcarrier spacing, a delay and reliability.

8. The terminal device of claim 6, wherein the uplink information further comprises at least one of channel state information (CSI) or uplink service data.

9. The terminal device of claim 6, wherein the processor is further configured to receive second configuration information sent by the access network device, wherein the second configuration information is used for configuring the second type of physical resources for the terminal device.

10. The terminal device of claim 6, wherein the correspondence between the multiple first physical resources and the multiple uplink logical channels comprises one of the following:
each first physical resource corresponds to one uplink logical channel;
each uplink logical channel corresponds to multiple first physical resources; or
each first physical resource corresponds to multiple uplink logical channels.

11. An access network device, a first type of physical resources in a target time unit being configured for transmission of a first scheduling request (SR), the first type of physical resources comprising multiple first physical resources, and the multiple first physical resources having a correspondence with multiple uplink logical channels, the access network device comprising a processor connected with a memory, wherein
the processor is configured to, when uplink information needs to be received in the target time unit, receive the uplink information and a second SR simultaneously sent by a terminal device on a second type of physical resources in the target time unit;
wherein the second type of physical resources is used for transmission of the uplink information, the first SR is used for indicating at least one uplink logical channel carrying data to be sent in the multiple uplink logical channels, the second SR is used for indicating there is uplink data in the terminal device to be sent, the second SR is not used for indicating at least one uplink logical channel carrying data to be sent in the multiple uplink logical channels, and parameters of at least two of the multiple uplink logical channels are different, and wherein the target time unit is a slot and is not a subframe, and the uplink information comprises feedback response information Acknowledgement (ACK)/Non-Acknowledgement (NACK).

12. The access network device of claim 11, wherein a parameter of each of the multiple uplink logical channels comprises a transmission time interval (TTI), a subcarrier spacing, a delay and reliability.

13. The access network device of claim 11, wherein the uplink information further comprises at least one of channel state information (CSI) or uplink service data.

14. The access network device of claim 11, wherein the processor is further configured to send second configuration information to the terminal device, wherein the second configuration information is used for configuring the second type of physical resources for the terminal device.

15. The access network device of claim 11, wherein the correspondence between the multiple first physical resources and the multiple uplink logical channels comprises one of the following:

each first physical resource corresponds to one uplink logical channel;

each uplink logical channel corresponds to multiple first physical resources; or each first physical resource corresponds to multiple uplink logical channels.

\* \* \* \* \*